United States Patent [19]
Jinman

[11] 3,754,254
[45] Aug. 21, 1973

[54] TARGET DETECTION BY DOPPLER SHIFT

[75] Inventor: Michael Jinman, Edinburgh, Scotland

[73] Assignee: Microwave and Electronic Systems Limited, Newbridge, Midlothian, Scotland

[22] Filed: Mar. 22, 1971

[21] Appl. No.: 126,744

[30] Foreign Application Priority Data
Mar. 20, 1970 Great Britain.................. 13,531/70

[52] U.S. Cl. ............ 343/7.7, 340/258 A, 343/5 PD
[51] Int. Cl. .......................................... G01s 9/42
[58] Field of Search............................ 343/5 PD, 7.7; 340/258 A

[56] References Cited
UNITED STATES PATENTS

| | | | |
|---|---|---|---|
| 3,242,486 | 3/1966 | Corbell............................. | 343/5 PD |
| 3,343,167 | 9/1967 | Rademacher..................... | 343/5 PD |
| 3,383,678 | 5/1968 | Palmer.............................. | 343/5 PD |
| 3,512,155 | 5/1970 | Bloice................................ | 343/7.7 |
| 2,649,538 | 8/1953 | Marlowe et al.................. | 343/5 PD |

*Primary Examiner*—Malcolm F. Hubler
*Attorney*—Sughrue, Rothwell, Mion, Zinn & Macpeak

[57] ABSTRACT

Detection of moving targets by detection of the doppler shift of radiation scattered or reflected by the target when illuminated by such radiation, is liable to give a false target indication if an interfering signal is received which has a frequency difference from the transmitted radiation lying in the range of the expected doppler shift. The problem is found in intruder alarm systems which use doppler shift detection. To mitigate the problem, the transmitted radiation is frequency modulated, by noise or by an audio tone, so that the scattered or reflected radiation has a coherence with the transmitted radiation but the interfering signal does not. The principle is applicable to both electromagnetic and pressure-wave radiation. In one intruder alarm system two separately operating, doppler shift detector units are coupled together to give a warning signal only when both indicate an intruder. Application of the above principle to one or both units prevents them giving false alarms due to mutual interference.

13 Claims, 2 Drawing Figures

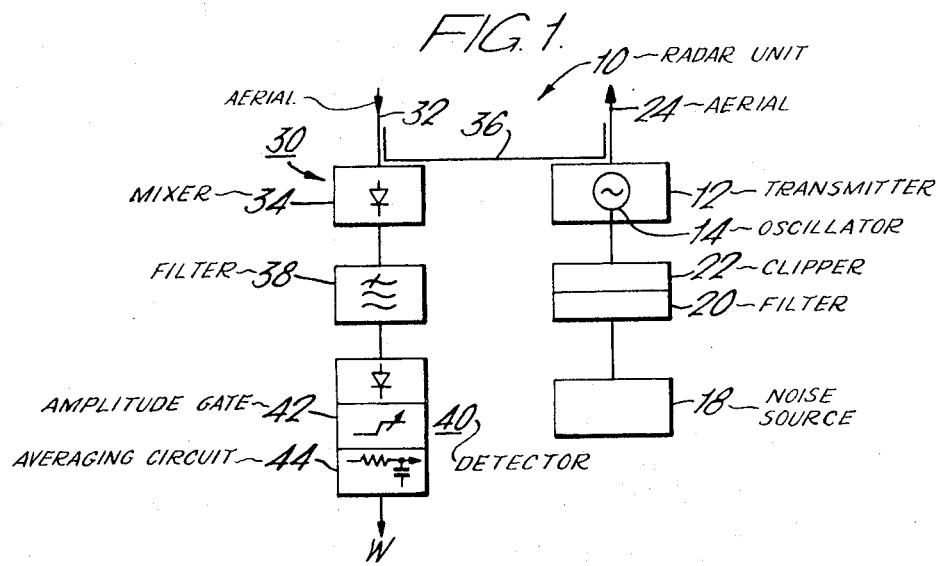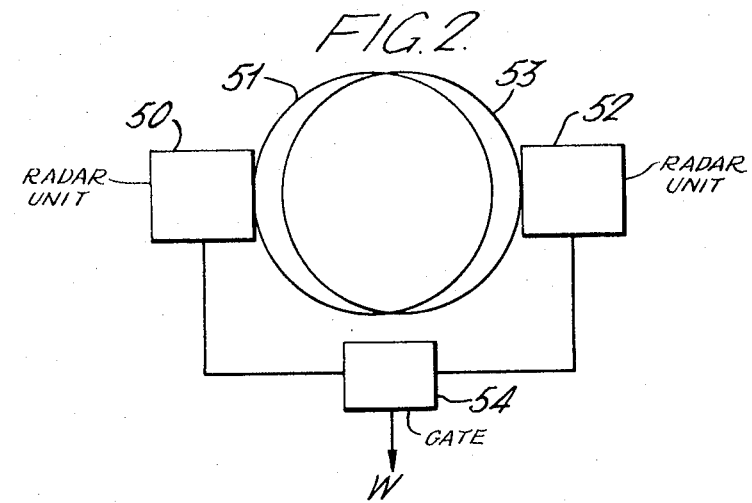

TARGET DETECTION BY DOPPLER SHIFT

This invention relates to apparatus for a system for and a method of target detection utilising the doppler shift of radiation reflected by or scattered by a target which is illuminated by such radiation. The radiation may be electromagnetic particularly in the microwave region or it may be pressure wave particularly at ultrasonic frequencies.

The invention will be described in relation to a radar apparatus but it will be realised that the principles given are equally applicable to pressure wave radiation.

The invention finds particular application in intruder alarm systems. Such systems may be used in the open air protecting a yard or other open space where the propagation can be considered to be free-space, in which case the target moving radially from the radar apparatus and illuminated thereby scatters radiation back to the apparatus which has a doppler shift component. The extent of shift is a function of radial velocity but in an intruder alarm system it is not generally required to measure velocity. Intruder alarm systems are, however, frequently used in cases where they are located in a warehouse or other enclosed space. In such a space, especially where high frequencies are used of the order of 10,000 MHz there is substantial reflection from walls and all permanent objects in the space and the free space propagation concept does not apply. Due to the multiple reflections there is set up a standing wave pattern of electromagnetic field in the surveyed space. Thus at any point in the field a target can be regarded as having impinging on it radiation components received from a number of directions other than directly from the radar apparatus. The movement of the target will cause doppler shifts in these components and the reflected or scattered radiation having this doppler shift will be received by the radar apparatus part direct and part having itself been reflected by walls etc. Thus the situation here is very complex but the resultant signal received at the receiver will be referred to as the doppler shift signal notwithstanding that it may be comprised of a number of components set up in the manner described.

In one form of intruder alarm a warning is given if there is detected a received signal having three characteristics: a frequency difference from the transmitted frequency within a predetermined band (normally the actual measurement of target velocity is not required); a duration long enough to cause the alarm to respond; and an amplitude sufficient to cause operation of the alarm to provide a warning signal.

The frequency difference is conveniently detected by heterodyning (sometimes called mixing) the received echo signal with a portion of the transmitter output and extracting the difference frequency signal. The band within which frequency difference is detected may be specified by a filter and/or may be determined by the inherent frequency limitations of the receiver circuits and the detector. The term receiver pass-band will be used to cover all these cases. A received signal need not be continuously present to cause the alarm to respond if the receiver includes an averaging or integrating circuit having a time constant enabling it to respond to a succession of short bursts of the echo during the averaging or integration period. A target-indicative signal is produced if the resultant over the period reaches a given level. The signal amplitude required to cause the system to respond may be determined by the inherent sensitivity of the receiver; or a deliberate amplitude gate may be employed to ensure that only signals above a certain amplitude are effective and to eliminate signals at or about the noise level of the system.

A false warning of an intruder may be given if there is received an interfering signal, not being a target echo and being unrelated to the transmitted signal, which has a frequency such as to provide a difference frequency signal within the receiver pass-band and which meets the amplitude and duration requirements of the system so as to cause the warning signal to be given. This situation can arise where two separate intruder alarms employing doppler shift radar are in relatively close proximity even though each is outside the accepted surveillance range of the other, it being assumed that the two radar systems operate on nominally the same or adjacent frequencies. The receiver of each radar may receive directly the transmitted radiation of the other. Due to factors such as drift in the transmitter frequencies these may have a frequency difference lying within the pass-band of each receiver for a length of time sufficient to provide a warning signal, each received signal being of sufficient amplitude for this to occur even though the two alarms lie outside one another's surveillance areas. The reason for this is that the received echo from a target decreases in strength as the fourth power of increasing range whereas the radiated field strength received directly from a transmitter decreases as the square of the range. The interference in such cases is likely to be mutual.

It has been proposed that in order to improve and shape the coverage of a surveyed space that more than one radar unit be used so that a warning is only given if the presence of an intruder is detected by all units simultaneously. The units may be coupled together through an AND-gate or the like to this end. In such an arrangement each unit is likely to receive a strong direct signal from the other, or at least one of the other units, and between the two or any two units the interference problem is likely to be mutual.

The severity of the interference problem in any particular case may be expressed as the probability of effective interference occurring within a set period which may be called the measurement period: the longer the measurement period the higher the probability. In the case of intruder alarms the measurement period is very long. It is therefore desirable to take steps to reduce this probability.

The present invention is based on the concept of so modulating the transmitted radiation for target detection by means of 'doppler shift' (as defined hereinbefore) that a receiver responds only to received radiation which is due to radiation from its own transmitter. In particular the transmitted radiation may be frequency modulated such that, although the instantaneous frequency of the radiation may be more often near the frequency of an interfering signal than would otherwise be the case, a difference frequency within the receiver pass-band is produced for too short periods to cause a target to be indicated.

In one aspect of the present invention, there is provided a method of operating a target detection apparatus in which a target is indicated by the detection of a received signal having a frequency difference from the transmitted frequency by a value within a predetermined range and lasting for a predetermined duration, wherein the transmitted frequency is modulated in such manner that there is a low probability of the difference frequency between the transmitted signal frequency and the frequency of a received interfering signal being within said predetermined range for sufficient time to indicate the presence of a target. Preferably the transmitted frequency is frequency modulated by a noise signal but an audio tone may be used.

In a further aspect of the invention there is provided a target detection apparatus comprising a transmitter, means for frequency modulating said transmitter, a receiver for producing a signal representing the difference frequency between the transmitted frequency and the frequency of a received signal, means responsive to the presence of a difference frequency-representing signal which represents a difference frequency within a predetermined range and lasts for a predetermined duration to provide a signal indicative of the presence of a target, said frequency modulating means being arranged to modulate the transmitted frequency in such manner that there is a low probability of the difference frequency between a received interfering signal and the transmitted signal being within said predetermined range for sufficient time to cause said target-indicative signal to be produced.

In a still further aspect the invention provides a target detection system comprising two target sensing units, each unit comprising a transmitter, an aerial system for radiating the energy generated by the transmitter and for receiving radiation, a receiver for the receiver radiation operable to produce a signal representing the difference frequency between the transmitted signal and the frequency of a received signal, and means responsive to the presence of a difference frequency-representing signal which represents a difference frequency within a predetermined range and lasts for a predetermined duration to provide a signal indicative of the presence of a target; and at least one of said units including means for frequency modulating the transmitter frequency thereof in such manner that there is a low probability of the difference frequency between an interfering signal received at said one unit and the transmitted signal of said one unit being within said predetermined range for sufficient time to cause said target-indicative signal to be produced; the aerial systems of said two units being arranged to survey a common volume of space; and the target detection system further comprising means coupled to receive the target-indicative signals from said two sensing units to produce a warning signal only if target-sensing signals are generated simultaneously by said two sensing units.

Preferably the frequency modulation means in the apparatus or system above defined provides a noise or audio tone modulation of the transmitted frequency.

The problem of interference signals may be greatly reduced by frequency modulating the transmitter signals in such a manner that a receiver responds only to the signals originating from its own transmitter.

It is also necessary to ensure that the modulating signals do not interact to produce significant signals within the receiver pass-band, which may occur, for example, if the difference between the modulating frequencies of two transmitters lies in this pass-band. To this end noise modulation, modulation by several randomly chosen frequencies, or modulation by selected frequencies in predetermined channels, may be used.

As an example, frequency modulation of the transmitters of an X-band intruder alarm system by noise has reduced interference signal levels by 30 db without affecting the other characteristics of the system.

The invention may be applied to range, velocity or proximity measurement by means of radar or pressure wave apparatus operating with doppler shift.

The two embodiments of the invention will now be described with reference to the accompanying drawings in which:

FIG. 1 shows a block diagram of an intruder alarm system using a doppler shift radar; and FIG. 2 shows a multiple radar unit intruder alarm system.

In FIG. 1 the intruder alarm system comprises a radar apparatus 10 having a CW transmitter 12 including an oscillator 14 for controlling the transmitter frequency. The oscillator may provide the output directly or through an amplifier. The oscillator has connected thereto a noise or tone source 18. The oscillator is preferably a Gunn diode operating in the X-band (10,000 MHz). The oscillator frequency is modulated in accordance with the amplitude of the noise or tone signal. Amplitude modulating the Gunn diode operating current causes a frequency modulation of the microwave output therefrom. When noise is used for modulation the white noise from source 18 may be passed through filtering and clipping devices 20 and 22 respectively to limit the amplitude and frequency range of the noise modulation signal and thereby limit the transmitted frequency deviation. The reasons for so doing are explained below. An aerial 24, for example a horn, is coupled to receive the transmitter output and to illuminate a space to be surveyed.

The radar apparatus further has a receiver 30 fed from an aerial 32, for example a horn, and including a mixer 34 to which are applied received signals and a proportion of the transmitter output, as for example, by a directional coupler 36 or a simple waveguide section coupling the mouths of the horns; or simply by leakage of energy from the transmitter to the receiver. The output of the mixer 34 feeds a low pass or band-pass filter 38 and the filter output is applied to a detector 40 which includes a time-delay circuit 44 and provides a warning signal W if there is an output from the filter present for at least a predetermined period of time. The detector may further include an amplitude gate 42 so that only mixer output signals above a certain amplitude can result in a warning signal W.

Mention has already been made of the detection of signals which are not necessarily continuous and to this end the detector preferably includes an integrating or averaging circuit as the delay circuit 44 whereby a warning signal is produced if some minimum level of output is achieved over the specified period set by the time constant of the circuit. In particular the detector circuit described in our copending application Ser. No. 5,5301 may be used.

The filter 38 may have an upper cut-off frequency selected to avoid the alarm being triggered by the passage of birds or fast moving insects through the surveyed space. Birds generally fly sufficiently quickly to give a higher doppler shift than would be expected from the movement of a human being in the surveyed space. Even if the filter 38 is omitted, the receiver will have a restricted bandwidth limiting the range of frequencies which can be passed to the detector. The filter may also have a lower frequency cut-off. This is particularly useful in pressure wave apparatus to avoid the effects of air movements.

The detection of moving targets by doppler shift needs no description here. The frequency modulation of the transmitted signal does not affect the detection of doppler shift provided that certain conditions are fulfilled. These conditions are discussed below.

If, assuming for the moment the source 18 is switched off, there is received an external or interfering signal at a frequency which, when heterodyned with unmodulated transmitter frequency in the mixer 34, produces a difference frequency within the receiver pass-band and which is of sufficient amplitude to actuate the detector, then a false warning signal will be given.

The probability of such interference may be reduced by modulating the frequency of the transmitter in such a manner that whilst coincidence or near coincidence of the transmitter frequency and the interfering signal frequency is more likely to occur, the time during which the difference frequency lies within the receiver pass-band on each occasion is too short for a warning signal to be given. In general where the radar transmitter signal and the interfering signal are not related, it can be shown that the optimum modulating signal is a noise signal through other forms of modulation such as a tone all produce considerable benefit. If the instantaneous transmitter frequency is substantially constant over the period for the radiation to travel to the target and back, the detected doppler shift signal will not be affected by the applied frequency modulation. Thus there will be a coherence between the transmitted and received radiation pertaining to the unit but no such coherence with an external signal.

FIG. 2 shows an example of a multiple unit intruder alarm using two radar units 50, 52 the receiver of each of which will recieve a strong signal directly from the transmitter of the other. The two units are identical and of the kind shown in FIG. 1. The units 50, 52 have response patterns 51, 53 respectively and the common surveyed space is that where the patterns overlap. The detector output of each radar unit is connected to a coincidence gate 54 from which a warning signal is obtained upon simultaneous sensing of a target by the two units 50, 52. If in the absence of modulation of the transmitter frequencies, the latter have a difference frequency within the receiver pass-bands each unit will detect an apparent moving target and the resulting simultaneous detector outputs will give a false warning signal.

Noise or tone modulation of the transmitter frequencies in the manner described will give protection against such mutual interference. Another way of looking at this is that there will be a coherence between the transmitted and received radiation pertaining to one unit but no such coherence as regards received radiation from the other unit or other source. Obviously where units are used in close proximity, the modulation frequencies are chosen to give the least likelihood of mutual interference.

In fact only one transmitter need be frequency modulated and in multiple unit alarm systems using three or more units not all the transmitters need be frequency modulated to give the required protection. However, from a manufacturing point of view it is better to manufacture identical units, each being tone or noise modulated.

Apart from intruder alarm systems the invention is applicable to systems in which it is desired to actually measure the proximity, range or velocity of a moving target using CW or pulse transmission.

The optimum frequency deviation and band width of the modulation depends on the characteristics of the particular system. Limits are set by the permitted frequency band limits in many systems, and by the requirement that the maximum frequency of the noise modulation or the tone frequency be much less than the reciprocal of the system transmission path time. (i.e., when detecting an echo at maximum range the transmitter frequency at the time the echo is received should not have departed significantly from the frequency of the signal which gave rise to the echo).

Despite these restrictions the usefulness of frequency modulation in reducing the probability of mutual interference, is considerable. As an example calculation indicates a reduction in this probability by 1,000 times in a particular intruder alarm system: in experiment, it has been found virtually impossible to induce interference in a noise modulated system, but relatively easy to do so in an unmodulated system. A tone modulation system may be less effective than noise but is much simpler and cheaper and in practice gives good results.

I claim:

1. Apparatus for detection of a moving target comprising:

a transmitter for producing output signals, and
   a receiver for receiving target echo signals and interfering signals, said receiver including a mixer responsive to a portion of the transmitter output signals and target echo signals for deriving therefrom Doppler shift signals resulting from the motion of the target illuminated by radiated transmitter output signals, means for blocking mixer output signals outside a prescribed frequency passband, and time duration detector means responsive to mixer output signals within said passband for producing a target indicative signal upon receipt of a plurality of cycles of said mixer output signals within a predetermined time interval,
   wherein said transmitter includes means for frequency modulating said transmitter output frequency at an average frequency sweep rate sufficiently high that, upon reception of an interfering signal having a frequency range within the frequency deviation range of said transmitter output signal, the time for which the difference frequency therebetween lies within said prescribed passband is too short to allow a significant mixer output signal to be derived in response to the interfering signal.

2. Apparatus as claimed in claim 1 wherein said frequency modulating means comprises a noise source.

3. Apparatus as claimed in claim 2 wherein said frequency modulating means includes means for limiting the frequency deviation of the transmitted frequency.

4. Apparatus as claimed in claim 1 wherein said frequency modulating means comprises a source of a repetitive waveform in the audio frequency range.

5. Apparatus as claimed in claim 1 wherein said transmitter operates in the microwave frequency region.

6. Apparatus as claimed in claim 5 wherein said transmitter comprises a Gunn diode oscillator.

7. Apparatus as claimed in claim 6 wherein said frequency modulator means is arranged to provide an amplitude modulated operating current for said Gunn diode oscillator whereby the latter is frequency modulated.

8. Apparatus as claimed in claim 1 wherein said receiver further includes an amplitude gate means for allowing only Doppler shift signals above a predetermined level to cause a target-indicative signal to be produced.

9. Apparatus as claimed in claim 1 wherein said time duration detector includes a circuit means for averaging the mixer output signals over a preselected period of time.

10. A system for detecting a moving target comprising a first moving target detection apparatus as claimed in claim 1, and a second moving target detection apparatus which comprises a transmitter, producing an output signal and a receiver having a mixer responsive to a portion of the transmitter output signal and to target echo signals to derive therefrom Doppler shift signals resulting from the motion of a target illuminated by the radiated output signal from the transmitter, and means coupled to said receiver mixer and responsive to Doppler shift signals lying within a prescribed frequency band to produce a target indicative signal upon detection of a plurality of cycles of said prescribed Doppler shift signal, wherein said first and second target detection apparatus are disposed relative to one another such that, in operation, each receives some radiated transmitter output signal from the other.

11. A target detection system as claimed in claim 10, wherein each apparatus comprises a respective aerial system for radiating said transmitter output signal and for receiving radiation to be coupled to the associated receiver mixer, said aerial systems being arranged to survey a common volume of space.

12. A target detection system as claimed in claim 11, further comprising means coupled to the respective Doppler shift signal responsive means of said first and second apparatus and responsive to said target-indicative signals therefrom to produce a warning signal only if said target indicative signals are generated simultaneously.

13. A target detection system as claimed in claim 10, wherein said second apparatus further includes means operable to frequency modulate said transmitter output signal thereof at an average frequency sweep rate sufficiently high that, upon reception of an interfering signal having a frequency within the frequency deviation range of said transmitter output signal, the time for which the difference frequency between the interfering signal frequency and the instantaneous transmitter output signal frequency lies within said prescribed frequency band is too short to allow an apparent Doppler shift signal to be derived from said receiver mixer of said second apparatus, and wherein the respective frequency modulation means of said first and second apparatus are operable at different modulating frequencies.

* * * * *